United States Patent [19]

Piccolo et al.

[11] 3,939,244

[45] Feb. 17, 1976

[54] PROCESS FOR THE PURIFICATION OF TITANIUM TETRACHLORIDE

[75] Inventors: Luigi Piccolo; Antonio Paolinelli, both of Milan; Marcello Ghirga, Bresso (Milan), Italy

[73] Assignee: Societa Italiana Resine S.I.R. S.p.A., Milan, Italy

[22] Filed: Nov. 27, 1972

[21] Appl. No.: 309,828

[30] Foreign Application Priority Data

Dec. 27, 1971 Italy .................................. 32955/71
May 3, 1972 Italy .................................. 23849/72

[52] U.S. Cl. ..................... 423/76; 423/77; 423/492
[51] Int. Cl.² ........................................ C01G 23/02
[58] Field of Search ........................ 423/76, 77, 492

[56] References Cited
UNITED STATES PATENTS

| | | | |
|---|---|---|---|
| 1,796,265 | 3/1931 | Freudenberg et al. | 423/646 |
| 2,224,061 | 12/1940 | Pechukas | 423/76 |
| 2,396,458 | 3/1946 | Cole et al. | 423/76 |
| 2,530,735 | 11/1950 | Schaumann | 203/29 |
| 2,754,255 | 7/1956 | Stambaugh | 203/37 X |
| 3,009,772 | 11/1961 | Wigginton | 423/76 |
| 3,533,734 | 10/1970 | Clark et al. | 423/492 X |

FOREIGN PATENTS OR APPLICATIONS

| | | | |
|---|---|---|---|
| 207,659 | 4/1957 | Australia | 423/492 |
| 674,315 | 6/1952 | United Kingdom | 423/492 |

OTHER PUBLICATIONS

Nuclear Science Abstracts, July 15, 1960, p. 1583.

Primary Examiner—Edward Stern
Attorney, Agent, or Firm—Sughrue, Rothwell, Mion, Zinn & Macpeak

[57] ABSTRACT

Process for the purification of titanium tetrachloride, in which the said titanium tetrachloride is brought into contact with a purifying agent consisting of an inert support in granular form on which metallic sodium or other reducing metal has been deposited in subdivided form, the said contact taking place either on crude liquid titanium tetrachloride with subsequent distillation to recover the purified titanium tetrachloride or on crude vaporised titanium tetrachloride with subsequent condensation to recover the purified titanium tetrachloride.

14 Claims, No Drawings

PROCESS FOR THE PURIFICATION OF TITANIUM TETRACHLORIDE

The present invention relates to the purification of titanium tetrachloride, and more particularly to a simple and economical method of purifying crude titanium tetrachloride.

In industry, titanium tetrachloride is normally produced by chlorination from rutile or ilmenitic ores or from ilmenitic slag or other materials containing titanium oxide, in the presence of carbon at elevated temperatures. Crude titanium tetrachloride which is obtained by condensation of the products of chlorination contains numerous impurities and ranges in colour from yellow to dark reddish brown.

More exactly, the said impurities consist of powders such as the original ores and carbon emanating from the chlorination reactor, undissolved products such as for example chlorides of chromium, iron, niobium, zirconium, dissolved products such as silicon chloride, the chlorides and oxychlorides of vanadium and partially dissolved products such as aluminium chloride. In addition, crude titanium tetrachloride contains dissolved gases such as phosgene, carbon dioxide, hydrogen chloride and chlorine, organic substances such as chloroacetyl chlorides and others of an unidentified nature. Crude titanium tetrachloride cannot therefore be directly used as a starting material in various processes which require a high degree of purity, such as the preparation of metallic titanium, titanium dioxide pigment and catalysts.

In these processes, titanium tetrachloride has to be purified before it can be used. The majority of the abovedescribed impurities may be separated by the systems normally used for the purpose, such as decantation, filtration and distillation.

Furthermore, small quantities of chlorides such as aluminium and silicon chlorides do not have any particularly harmful effects on the end products.

Nevertheless, one particular problem is created by the salts of vanadium, particularly the oxychloride form ($VOCl_3$) and the tetrachloride form ($VCl_4$), which cannot for practical purposes be separated, because they have a boiling temperature very close to that of the titanium tetrachloride. It is well-known that vanadium salts are virtually always present in crude titanium tetrachloride and small quantities of such salts are sufficient to impart undesired properties to the tetrachloride. For example, some 10 parts by weight per million are sufficient for the titanium dioxide obtained by treatment of tetrachloride with oxygen, to have unsatisfactory colour characteristics. In the prior art, numerous systems of purifying titanium tetrachloride of vanadium compounds are already known.

Another problem which is quite important in the purification of titanium tetrachloride is linked with the presence of organic substances such as chloroacetyl chlorides and others of unidentified nature, which can be eliminated by special treatments which are however economically disadvantageous and not easily performed.

Such substances have a negative influence on the production of metallic titanium, in that they increase its hardness and therefore adversely affect its mechanical properties; furthermore, in the process of producing titanium dioxide from titanium tetrachloride, the organic substances, decomposing on the surface of the titanium tetrachloride evaporators, give rise to the formation of a carbon deposit which reduces the evaporating efficiency and renders frequent cleaning necessary.

However, the main problem is always created by the vanadium salts.

In the industry, numerous systems of purifying titanium tetrachloride of vanadium salts are known.

Generally, the vanadium salts are converted into products with a boiling point far higher than that of the titanium tetrachloride, which can then be easily separated by distillation.

In particular, treatment with copper powder which converts the vanadium compounds into products of low valency are widely used, the boiling point of the resultant products being sufficiently higher than the boiling point of titanium tetrachloride, and oleic acid treatment which converts the vanadium compounds into high boiling complexes.

Both systems call for the titanium tetrachloride to be treated at boiling temperature, under agitation, for a sufficiently long period, followed by distillation and rectification.

The copper powder treatment is however economically burdened by the high cost of the actual copper, by the need to use a considerable excess of copper with respect to the impurities to be separated, by the difficulty of recovering the copper from the sludge produced by the treatment, and by the not inconsiderable treatment times.

Also the use of oleic acid has its disadvantages: in particular, it gives rise to gummy and sticky slime which is not easily removed from the bottom of the tanks.

Furthermore, with these types of treatment, the organic impurities remain in the tetrachloride in quantities which cannot be disregarded and which, to be reduced, necessitate a separate treatment, for example with chlorine and $AlCl_3$ at boiling point for an extended period.

These and other difficulties are overcome by the method according to the present invention.

One object of the present invention is an improved method of purifying crude titanium tetrachloride obtained in the processes of chlorination or rutile or ilmenitic ores, ilmenitic sludge or other materials containing titanium dioxide.

A further object of the present invention is a simple and economical method of purifying the said crude titanium tetrachloride.

Another object of the present invention is a new agent for the purification of titanium tetrachloride, endowed with high activity, to make it possible to work at high or low temperatures for reduced periods and with small quantities of the actual agent and which furthermore act at the same time as an eliminator of vanadium and organic substances allowing complete purification in a single stage, whereas the known methods call for two stages for elimination of the organic substances and the vanadium salts respectively.

Another object is a method of preparing the said new agent for purifying titanium tetrachloride.

These and other objects will become more evident from the ensuing description of the invention.

In its more general aspects, the purification process according to the present invention consists essentially in bringing the crude titanium tetrachloride obtained in the processes of chlorination of rutile or ilmenitic ores or ilmenitic slags or other materials containing $TiO_2$, into contact with a purifying agent consisting of a sub-divided inert support on which a reducing metal has been deposited in subdivided form.

Particularly useful among the reduction methods applicable are the methods involving alkali metals, and of these sodium is preferred.

Therefore, in the ensuing description, reference will be made to those purification agents which consist of an inert support on which sodium has been deposited, even though it is not intended absolutely to limit the invention to this reducing agent.

More particularly according to the process of the present invention, purification agents used are the products obtained by depositing metallic sodium in sub-divided form on materials of granular form which do not react with the sodium and with the titanium tetrachloride under the conditions of purification. There are many materials which have these characteristics: high boiling organic polymers, mineral substances, salts and oxides.

More precisely, among the oxides, silica, alumina, rutile, zinc and magnesium oxides and preferably silica and alumina; of the metallic salts, the salts of the alkali or alkaline earth metals, and preferably sodium chloride and potassium chloride; of the minerals, diatomaceous earth, pumice, asbestos, bauxite, quartz, alumino silicates, silicates and preferably diatomaceous earth and pumice; of the high boiling organic polymers, powders of polymeric materials and preferably high-density polyethylene and polypropylene powders.

Satisfactory results are also obtained by using porcelain, glass and active carbon as the inert support material.

The inert support materials are used preferably as granules of a diameter not exceeding 1 mm, and even more preferably with diameters comprised between 0.05 and 0.25 or 0.5 mm.

However, satisfactory results can also be obtained with granules of a diameter greater than 1 mm such as for example up to 2 mm or 3 mm.

The purifying agent according to the present invention is prepared by bringing the sodium to melting point in an enclosed vessel containing the sub-divided inert material, the whole being maintained in this state, under agitation, for a period of time of not less than 15 minutes and preferably from 30 minutes to 2 hours, and then allowing the mixture to cool slowly, still under agitation, over a period which is not less than 15 minutes and which is preferably between 30 minutes and 2 hours.

During the cooling and the consequent solidification, the sodium remains clinging to the granules of inert material.

The quantity of sodium supported varies according to the type of support and the degree of sub-division of the actual support used.

Thus, with a powder such as calcined alumina, it is possible to obtain sodium concentrations above 20% by weight, while with powders such as sodium chloride, it is not possible to exceed 5%.

In practice, with powders of a granulometry of 0.1 to 1 mm and a specific area of less than 1 sq.m/g, the procedure should be such that the final quantities of sodium are comprised between 3 and 10 parts for every 100 parts by weight of inert material.

Alternatively there may be used with an inert support of a granulometry comprised between 0.05 and 0.5 mm and a specific surface area in excess of 1 sq.m/g, metallic sodium in such a quantity that its final concentration in the purifying agent produced is comprised in the range from 10 to 25 parts by weight per 100 parts of inert support.

These proportions are suitable for processes as described below in which the purifying agent is added directly to the crude titanium tetrachloride in the liquid state.

Where as also described below the titanium tetrachloride is in gaseous form, then preferably the reducing metal, and particularly sodium, is deposited on the inert support in a quantity equal to or less than 6.5% by weight with respect to the support itself. It has in fact been found that for quantities of reducing metal in excess of approximately 6.5% by weight, agglomeration takes place among the particles of purifying agent, during treatment of the titanium tetrachloride at elevated temperature.

Moreover, it is not suitable to drop to values below approximately 1% by weight of reducing metal with respect to the support, in that the productivity of the purified titanium tetrachloride would be excessively reduced.

It has been found that the best conditions are achieved with quantities of reducing metal ranging from 2.5 to 5.0% by weight with respect to the support.

For the purification of crude titanium tetrachloride, it is possible for the purifying agent to be added directly to the titanium tetrachloride. The reaction commences already at room temperature and produces a spontaneous rise in temperature up to 40° to 45°C approximately. This is followed by heating up to 80°–90°C approximately, this temperature being maintained for between 15 minutes and 2 hours and preferably 30 minutes to 1 hour. After separation of the solids in suspension, the product is distilled in order to separate the titanium tetrachloride, the result being a high degree of purity.

According to another form of embodiment of the purification process of the invention, the crude titanium tetrachloride percolates through a column filled with the purifying agent. The temperature of the titanium tetrachloride is regulated in the range from 50° to 90°C, while the rate of throughput must allow dwell times of between 15 minutes and 2 hours and preferably between 30 minutes and 1 hour.

The product of percolation is then subjected to distillation in order to separate titanium tetrachloride which is again of high purity.

According to the process of the present invention, titanium tetrachloride is obtained which has a vanadium salts content of below 5 ppm when the purification agent is used in such a quantity that the sodium introduced is comprised in the range from 0.15 to 0.30 parts by weight to every 100 parts by weight of crude titanium tetrachloride.

As an alternative process according to the present invention it has been found possible to produce titanium tetrachloride with a degree of purity equal to or greater than that obtained according to the process above when the crude titanium tetrachloride in gaseous form is brought into contact for brief periods of time with the purifying agent containing a low quantity of reducing metal and then the vapours thus treated are condensed.

More particularly, the purification process according to the present invention consists in bringing into contact at high temperatures and for a time not exceeding 2.5 seconds the crude gaseous titanium tetrachloride obtained in the processes of chlorination of titanium ores or generally materials containing titanium, with a purifying agent consisting of an inert and subdivided support on which a quantity of reducing metal equal to or less than 6.5% by weight with respect to the support itself has been deposited, and in then condensing the vapours of titanium tetrachloride originating from such treatment.

It has been found that, by carrying out purification at temperatures equal to or greater than approximately 100°C, extremely pure titanium tetrachloride can be obtained directly, or at least a product with a degree of purity such that no further purification treatment is required.

Accordingly, therefore, the crude titanium tetrachloride and the purifying agent previously described are brought into contact in working temperatures equal to or greater than 100°C and preferably equal to or greater than 110°C, up to temperatures of approximately 170°C.

In fact, it has been found that, by working at temperatures below 100°C, it is not possible to obtain titanium tetrachloride with a satisfactory degree of purity. Furthermore, no substantial advantage is obtained by carrying out purification at temperatures above approximately 170°C.

Futhermore, the treatment is carried out at pressures equal to or below ambient pressures, more particularly at a pressure below ambient pressure when the temperature chosen for purification is less than the boiling temperature of titanium tetrachloride at ambient pressure.

The contact times between the purifying agent and the titanium tetrachloride which is subjected to purification are maintained at values ranging from 0.5 to 2.5 seconds. It has in fact been found that for contact times shorter than approximately 0.5 seconds, a sufficiently high purification effect is not obtained, whereas no substantial advantages are achieved by the contact times exceeding approximately 2.5 secs.

In the preferred form of embodiment of the present invention, the vapours of titanium tetrachloride are brought into contact with the particles of purifying agent in fluidised form.

In this case, the purifying agent will preferably be in the form of particles ranging in size from 0.05 to 0.25 mm, while at the base of the fluidised bed, titanium tetrachloride is supplied as such or in mixture with an inert gas, such as for example nitrogen. Furthermore, it is advisable to maintain the velocity of the gas flow through the bed of solid particles at around 3 to 20 cm/second.

It is also possible to use the purifying agent in the form of a fixed or movable bed. In this case, it is appropriate to use such a purifying agent in the form of particles ranging in size from 0.5 to 3.0 mm, while the velocity of the gas flow supplied will be so regulated as to achieve periods of contact between the range of times as previously defined.

Even in the case of a fixed bed or a movable bed being used, it is possible to supply the titanium tetrachloride vapour in mixture with an inert gas.

It should be noted that by proceeding according to the method of the present invention, no aggregation or compaction phenomena occur in the particles of purifying agent, and this is surprising in that the titanium tetrachloride is purified in a range of temperatures above the melting temperature of the reducing metal used.

The fundamental advantage of the process of the present invention resides in the fact that titanium tetrachloride of high purity is directly obtained.

With regard to the processes for purifying crude titanium tetrachloride according to the prior art, the method according to the present invention has numerous advantages: in particular, shorter treatment times and lower temperatures, use of smaller quantities of purifying agent, less cost of purifying agent, greater activity of purifying agent, simultaneous purification (and without using further purifying agents) of vanadium compounds and organic substances. Therefore, the process according to the present invention for purifying crude titanium tetrachloride obtained by chlorination from rutile or ilmenitic ores or ilmenitic slags or other materials containing titanium dioxide is particularly advantageous by virtue of its efficiency and by reason of its simplicity of performance and its economy.

The use of the above-described purifying agents is therefore essential for the purposes of our invention, also in consideration of the fact that the said purposes are not absolutely attainable by the use of unsupported sodium, even though used in granular form with a granulometry of the order of that of the purifying agent.

The invention will now be illustrated by the following examples which are not however intended to limit in any way the scope of the invention.

EXAMPLE 1

Into a cylindrical reactor fitted with an agitator, perfectly dried and in a nitrogen ambient, 200 g of alumina powder with a granulometry of between 50 and 250 microns and a specific surface area equal to 105 sq.m/g and 20 g of sodium, in lumps, were placed and the whole was heated to a temperature of 200°C and maintained at that temperature, under agitation, for 1 hour. Slow cooling was then carried out over a period of 2 hours, still under agitation, until room temperature was attained.

The dark gray homogeneous powder discharged from the reactor was then kept in an oxygen and humidity free ambient.

In fact, on contact with the air the powder oxidised instantly, bursting into flame.

To 100 g crude titanium tetrachloride of deep yellow colour, containing 1300 ppm vanadium salts were added 25 g of the powder obtained as above, corresponding to 2.5 g of metallic sodium.

The sodium reaction commenced at room temperature and the temperature of the mixture rose instantly from 21° to 42°C.

The mixture was then heated to 90°C for 2 hours, under agitation. The product obtained, green-grey in colour, clearly indicating the fact that the vanadium salts had been reduced to compounds of a lesser valency, after separation by decantation of the solids in suspension, were transferred to a flask in which it was subjected to distillation.

The titanium tetrachloride separated turned out to be completely colourless, with a vanadium salts content, expressed as metallic vanadium, less than 1 ppm and an organic substances content, expressed as carbon, equal to 240 ppm.

EXAMPLE 2

The example serves to compare the efficiency of the purifying agent of the invention with that of the purifying agent of the type known in the industry.

For this purpose, to 1000 g of crude titanium tetrachloride of the type of Example 1 were added 20 g of copper cement and the whole was treated at boiling point and allowed to fall to 136°C for 2 hours. The product obtained, after decantation to separate the suspended solid particles was transferred to a flask in which it was subjected to distillation.

In this way, 150 g of distillation product were obtained, pale yellow in colour, containing 18 ppm of vanadium salts expressed as metallic vanadium, while the remainder was colourless, with a vanadium salts content — expressed as metallic vanadium — equal to 4 ppm and an organic substances content, expressed as carbon, equal to 1150 ppm.

EXAMPLE 3

Proceeding as in Example 1, 200 g of alumina calcined at high temperature, with a granulometry comprised between 0.05 and 0.25 mm and a specific area equal to 2.5 sq.m/g, and 40 g of sodium in lumps were placed in a reactor of the same type as described in Example 1.

An homogenous powder of a grey colouring was obtained and this, on contact with the air, exhibited less reactivity compared with the dispersion mentioned in Example 1.

To 1000 g titanium tetrachloride of the same type as in Example 1 were added 10 g of the powder obtained, corresponding to 2.0 g metallic sodium.

The procedure according to Example 1 then continued.

The titanium tetrachloride separated after distillation proved to be completely colourless, with a vanadium salts content, in terms of metallic vanadium, of less than 1 ppm and an organic substances content, in terms of carbon, equal to 210 ppm.

EXAMPLE 4

Proceeding in the same way as Example 1, to 200 g alumina of a granulometry comprised between 50 and 250 microns and a specific surface area of 2.5 sq.m/g, were added 40 g sodium, in lumps.

The product obtained was filled into a column through which titanium tetrachloride of the type used in the previous examples was passed from top to bottom, at a temperature of 90°C and at a rate such as to allow a dwell time equal to 60 minutes. The product obtained was transferred to a flask in which it was subjected to distillation.

The titanium tetrachloride separated proved to be completely colourless, with a vanadium salts content of less than 1 ppm and an organic substances content, expressed as carbon, equal to 290 ppm.

EXAMPLE 5

Proceeding as in Example 1, 200 g sodium chloride of a granulometry comprised between 0.1 mm and 1.0 mm and 10 g of sodium in lumps were placed in a reactor of the same type. To 1000 g titanium tetrachloride of the same type as in Example 1 were added 40 g of the powder obtained, corresponding to 2.0 g metallic sodium.

The same procedure as in Example 1 was then continued.

The titanium tetrachloride separated after distillation proved to be completely colourless, with a vanadium salts content of less than 1 ppm and a content of organic substances, expressed as carbon, equal to 320 ppm.

EXAMPLE 6

The example serves to compare the effectiveness of the purifying agent of the invention with that of sodium supplied as such.

For this purpose, to 1000 g crude titanium tetrachloride of the same type as in Example 1 were added 2.5 g metallic sodium in sub-divided form.

The procedure according to Example 1 was then continued.

The product maintained its initial colouring and was subjected to distillation, producing titanium tetrachloride with a vanadium salts content equal to 1000 ppm and an organic substances content, expressed as carbon, equal to 2400 ppm.

EXAMPLE 7

The same procedure was adopted as in Example 1, but with a treatment time of 30 minutes instead of 2 hours, at 90°C. Substantially the same results were obtained.

Further advantages of the process in vapour phase, according to the present invention, consist in an easier application for a continuous conduction and in a greater productivity per useful volume of the reactor used for purification. The examples following relate to such processes.

EXAMPLE 8

Into a cylindrical reactor fitted with an agitator are charged 200 g alumina granules having the following granulometric distribution: 0.125–0.25 mm: 15.6%; 0.105–0.125 mm: 6.9%; 0.062–0.105 mm: 61.8%; 0.05–0.062 mm: 15.7% by weight. The specific surface area of the alumina is moreover equal to 105 sq.m/g, determined by the B.E.T. method.

6 g of sodium in lumps are also placed in a reactor.

Throughout the operations, a perfectly anhydrous ambient is maintained in the reactor and the process is carried out in a nitrogen atmosphere. The mixture is then heated to a temperature of 200°C and agitated while it is kept at that temperature for 1 hour.

The mass is then gradually cooled, its temperature being brought to ambient values over a period of approximately 2 hours. Finally, the purifying agent is discharged in the form of easy running powder of dark-grey colour and this purifying agent is kept in an anhydrous ambient under an atmosphere of inert gas.

EXAMPLE 9

40 g of the purifying agent, the preparation of which has been described in Example 8, are placed in a glass column of 22 mm diameter, fitted with a porous screen in the bottom, cooling means in the top and fitted with an external jacket through which the exchanger liquid is circulated.

At the bottom of the column, through the porous screen, nitrogen is supplied in a quantity equal to 61 N litres/hour, thus ensuring satisfactory fluidisation of the particles of purifying agent.

The exchanger liquid is then heated until the temperature inside the reactor is raised to approximately 150°C.

When this temperature is reached, the supply of titanium tetrachloride vapour is started while the stream of nitrogen is gradually diminished.

In particular, the throughput of nitrogen is reduced to 30.5 N litres/hour while the throughput of titanium tetrachloride is increased to 30.5 N litres/hour, this latter being supplied to the reactor in the form of superheated vapour at a temperature of approximately 145°C. The process is then continued for 2½ hours, the temperature inside the reactor being maintained at approximately 150°C and the gaseous flow emerging at the head of the reactor being cooled and the condensed liquid collected.

Analysis of the titanium tetrachloride purified in this way has revealed the following result: vanadium less than 1 part per million, organic substances content (expressed as carbon) 160 parts per million.

Throughout the entire period of the test, no aggregation or compaction of the fluidised particles was observed.

EXAMPLE 10

The same procedure was adopted as in Example 9, with the sole difference that the temperature inside the reactor was maintained at approximately 135°C. Analysis of the purified product gave the following results: vanadium content equal approximately to one part per million, organic substances content (expressed as carbon) 190 parts per million.

EXAMPLE 11

The same procedure was adopted as in Example 9, with the sole difference that the temperature inside the reactor was maintained at approximately 125°C. Analysis of the purified titanium tetrachloride produced the following results: vanadium content equal to 2.5 parts per million, organic substances content (expressed as carbon) 205 parts per million.

EXAMPLE 12

The same procedure was adopted as in Example 9, with the sole difference that the temperature inside the reactor was maintained at approximately 115°C. Analysis of the purified titanium tetrachloride produced the following results: vanadium content equal to 22 parts per million, organic substances content (expressed as carbon) 260 parts per million.

EXAMPLE 13

The same procedure was adopted as in Example 9, with the sole difference that the flow of nitrogen was completely replaced by the flow of vaporised titanium tetrachloride.

The procedure was followed for 75 minutes, 61 N litres/hour titanium tetrachloride being supplied to the reactor. During this period, there was no compaction or agglomeration of the particles in the fluidised bed. Furthermore, analysis of the purified product demonstrated a vanadium content of less than 1 part per million and an organic substances content (expressed as carbon) of 165 parts per million.

EXAMPLE 14

The same procedure was adopted as in Example 9, with the difference that the flow of nitrogen to the bed of particles of purifying agent was reduced to 30.5 N liters/hour while the flow of vaporised titanium tetrachloride was increased to 61 N liters/hour.

This procedure was followed for 75 minutes, during which time there was satisfactory fluidisation of the particles of purifying agent, with no phenomena of compaction or agglomeration of the actual particles.

Furthermore, analysis of the purified titanium tetrachloride produced the following results: vanadium content less than 1 part per million, organic substances content (expressed as carbon) 195 parts per million.

EXAMPLE 15

The same procedure was adopted as in Example 14, with the sole difference that the temperature inside the reactor was maintained at 125°C. Analysis of the purified product demonstrated a vanadium content equal to approximately 1 part per million and an organic substances content (expressed as carbon) at 215 parts per million.

EXAMPLE 16

A purifying agent is prepared, consisting of sodium supported on alumina and containing 5% by weight of sodium with respect to the support medium.

In the preparation, the procedure was adopted was completely the same as that described in Example 8. The resultant purifying agent was used for purifying crude titanium tetrachloride, proceeding as described in Example 9. The purification test was carried out for 5 hours and during this period of time there was no phenomena of compaction or agglomeration of the particles in the fluidised bed. Furthermore, analysis of the purified product revealed a vanadium content of less than one part per million, and an organic substances content (expressed as carbon) of 165 parts per million.

In all the experimental examples, a crude titanium tetrachloride was used (obtained by chlorination of mineral rutile) with a vanadium salts content — expressed in terms of vanadium — equal to 1,300 parts per million and an organic substances content — expressed as carbon — equal to 1,650 parts per million.

We claim:

1. Process for the purification of titanium tetrachloride in gaseous or liquid form, obtained by chlorination of rutile or ilmenitic ores or ilmenitic slag or other materials containing titanium dioxide in the presence of carbon at elevated temperatures to remove organic impurities so that the titanium tetrachloride product is colorless and to remove vanadium compounds so that the residual content of vanadium metal is less than 5 p.p.m., characterized in that said titanium tetrachloride is brought into contact with a purifying agent consisting of a support selected from alumina or sodium chloride when said titanium tetrachloride is purified in liquid form and a support of alumina when said titanium tetrachloride is purified in gaseous form, said support being in granular form which is inert to metallic sodium and titanium tetrachloride with which metallic sodium has been contacted by bringing the sodium to its melting point in a closed vessel containing the granular inert support material under agitation for at least 15 minutes, and allowing the resulting mixture to cool slowly, under agitation, over at least a 15 minute period to solidify the sodium on the granules, when said purification is carried out in liquid form, the alumina has a granulometry of between 0.05 and 0.5mm particle size and a specific surface area in excess of 1 sq.m./g and the sodium amount contacted with the alumina is in such a quantity that the final concentration thereof in the purifying agent is in the range of from 10 to 25 parts by weight per 100 parts of inert support and the sodium chloride is of a particle size of between 0.1 and 1 mm and the specific surface area thereof is less than 1 sq.m./g with the amount of sodium contacted therewith being in a quantity so that the final concentration thereof in the purifying agent is between 3 and 10 parts by weight per 100 parts of inert support, and when the purification is carried out in gaseous form, the alumina has a particle size of between 0.05 and 0.5 mm, the specific surface area thereof is in excess of 1 sq.m./g and the amount of sodium contacted therewith is in a quantity so that the final concentration thereof in the purifying agent is between 1 and 6.5 parts by weight per 100 parts by weight of inert support.

2. Process according to claim 1, characterised in that the periods are 30 minutes to 2 hours.

3. The process of claim 1 wherein the purification is carried out in liquid form.

4. The process of claim 1 wherein the purification is carried out in gaseous form.

5. The process of claim 4 wherein the sodium is used in a quantity so that its final concentration in the purifying agent is between 2.5 and 5 parts by weight per 100 parts by weight alumina.

6. Process according to claim 3, characterised in that the titanium tetrachloride is brought into contact with the purifying agent in liquid form and the product obtained is distilled.

7. Process according to claim 6, characterised in that the purifying agent is added to the crude titanium tetrachloride at ambient temperature, the temperature of the resultant mixture is brought to 80° to 90°C, the said mixture being maintained at that temperature for a period comprised between 15 minutes and 2 hours, the suspended solids being separated and the resultant solution being subjected to distillation.

8. Process according to claim 6, characterised in that the crude titanium tetrachloride is caused to percolate at a temperature between 50° and 90°C through a column filled with purifying agent, the rate of throughput being regulated so that the dwell times are comprised between 15 minutes and 2 hours, after which it is subjected to distillation.

9. Process according to claim 6, characterised in that the purifying agent is used in such a quantity that the sodium introduced is comprised in the range from 0.15 to 0.30 parts by weight for every 100 parts by weight of crude titanium tetrachloride.

10. The process according to claim 4 wherein during said gaseous purification the temperature is equal to or greater than 100°C and the contact time is 0.5 to 2.5 seconds and then the treated titanium tetrachloride is condensed.

11. Process according to claim 10, characterised in that the period for preparing the purifying agent is 30 minutes to 2 hours.

12. Process according to claim 10, characterised in that the temperatures during contact are between 110° and 170°C.

13. Process according to claim 10, characterised in that the purifying agent, in particles of 0.05 to 0.25 mm, is in the form of a fluidised bed.

14. Process according to claim 10, characterised in that the purifying agent, in particles of 0.05 to 3.0 mm, takes the form of a fixed or movable bed.

* * * * *